INVENTORS
WILLEM C. NIEUWPOORT
RICHARD BLEEKRODE
BY
AGENT

United States Patent Office 3,510,797
Patented May 5, 1970

3,510,797
ACETYLENE FLAME LASER
Willem Cornelis Nieuwpoort and Richard Bleekrode, Emmasingel, Eindhoven, Netherlands, assignors, by mesne assignments, to U.S. Philips Corporation, New York, N.Y., a corporation of Delaware
Filed Aug. 24, 1965, Ser. No. 482,116
Claims priority, application Netherlands, Aug. 29, 1964, 6410083
Int. Cl. H01s 3/22
U.S. Cl. 331—94.5    3 Claims

ABSTRACT OF THE DISCLOSURE

A flame laser wherein light emission is stimulated by a resonator reaction between two gases entering a resonator from one or more gaps arranged parallel to the axis of the resonator.

---

This invention pertains to a device for producing light by stimulated emission of radiation. The invention relates in particular to such a device wherein the radiation is produced by means of chemically reacting gases.

Proposals have been made to use chemically reacting gases for producing stimulated emission of radiation, an inversion in the population between two vibration levels of an electron condition producing stimulated emission of infra-red radiation. In these proposals, the gases are first converted into the active (atomic) condition; this may be done, for example, by means of an electric discharge.

It has also been proposed to obtain stimulated emission of microwave energy by using a reacting mixture of atomic nitrogen and methylene chloride wherein inversion occurs between higher rotation levels of one of the intermediate products present.

It is a general object of the invention to provide a device by means of which stimulated emission of light can be obtained; a more specific object is to provide such a device using chemically reacting gases.

Briefly, in accordance with the invention, stimulated light emission is produced by means of a flame reaction supported by at least two gases, the latter maintaining a self-supporting reaction. The reaction space is arranged inside an optical resonator, the gases entering the resonator from one or more gaps arranged parallel to the axis of the resonator. The gases contain carbon and hydrogen and the conditions are maintained such that the released energy results at least partially in an overpopulation of one or more electron levels in the gases present or formed, such overpopulation being sufficient for stimulated light emission to occur.

As used in this specification, the term "flame reactions" includes all self-supporting reactions of gas mixtures occurring with the production of energy; it is not limited only to the combustion of a gas with air or oxygen.

Figure 1:
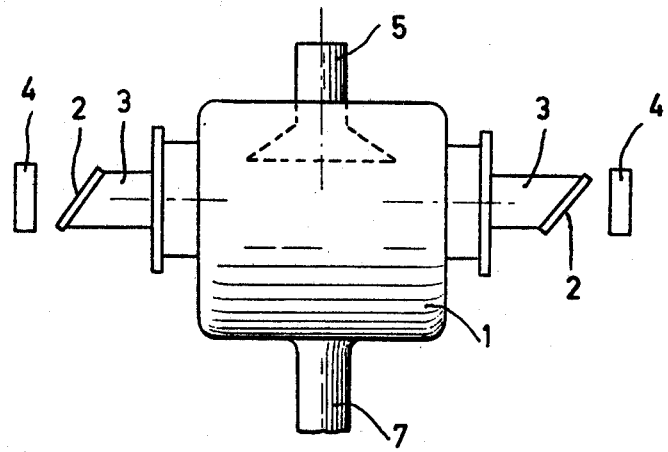
Figure 2:
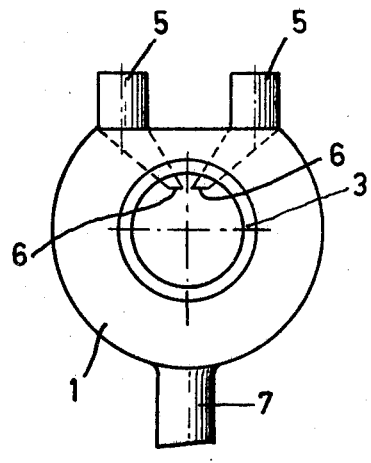

The invention will be better understood from the following more complete description thereof taken in conjunction with the accompanying drawing, wherein:

FIGS. 1 and 2 are both partly diagrammatic and partly cross-sectional views of a device according to the invention.

In the figures, reference numeral 1 denotes a cylindrical reaction chamber. Two quartz windows 2 are arranged at the ends of reaction chamber 1 on narrow tubular extensions 3 as shown. The windows are arranged to make an angle less than the Brewster angle with the axis of the system and are advantageously made of quartz in order that the flames should not adversely affect them. Mirrors 4 are provided and constitute the optical resonator of the system. Two glass tubes 5 are provided as shown, each having a gap 6 at its end opening into reaction chamber 1; the two gases are applied through the tubes 5 under suitable pressure. Reference numeral 7 denotes an exhaust line.

The ignition of the gases can be effected by means of a high frequency electrical discharge in the supply line of one of the gases leading to one of the tubes 5. The high frequency discharge may be ended after the ignition of the flame; thus, a constant supply of active gases is not necessary.

The embodiment of FIGS. 1 and 2 provides for supplying the reactive gases separately to the reaction chamber. However, the device will operate equaly as well if the gases are first mixed and then supplied together through one tube 5 to the reaction chamber.

A particularly suitable reaction for the device described has been found to be the combustion of acetylene with oxygen; with these gases, strong bands occur in the near ultra-violet region and in the visible region.

Illustrative dimensions of a preferred embodiment of the device described above were found to be as follows: The reaction chamber was cylindrical and had a diameter and length of 40 cm., each gap 6 was 20 cm. long and 0.5 cm. wide; acetylene and oxygen were applied under a pressure such that, taking into account the influence of the pumping device connected to the exhaust line 7, the pressure in the flame space was approximately 10 mm. of mercury column. In general, it has been found that, to obtain an optically homogeneous reaction zone and also to restrict as much as possible the disturbing influence of gas molecules colliding with each other, it is desirable to choose the pressure in the reaction chamber to be between 1 and 50 mm. of mercury column.

With a total supply of 20 cm.$^3$ of acetylene of 1 atm. per second and complete combustion thereof, strong bands occur in the light in the proximity of 3900, 4300, 4700, 5100, and 5600 AU which bands originate from CH-groups and of double-bonded carbon atoms. Bands also occur in the proximity of 2800 and 3100 AU; these originate from OH-groups.

While the invention has been described with respect to a specific embodiment, various changes and modifications thereof will readily occur to those skilled in the art without departing from the inventive concept. For example, it is also possible to add metal compounds in gas form in addition to the hydrocarbons; in this case, the metal atoms can be brought to the inversion which is required for stimulated emission by collisions with high energy molecules or fragmentation products thereof. If required, it is also possible to atomize solutions of compounds of metals in a gas current. Suitable metals are the transition metals and the rare earths.

What we claim is:

1. A device for producing stimulated light emission by means of flame reactions comprising: an optical resonator, a reaction chamber inside said optical resonator, means for introducing acetylene and oxygen into said chamber comprising at least one tubular element having one end terminating in a gap arranged parallel to the axis of the optical resonator, the released energy of the flame reaction caused by the mixture of said acetylene and oxygen resulting at least partially in an overpopulation of one or more electron levels in the gases present or formed, said overpopulation being sufficient for stimulated light emission to occur.

2. A device as claimed in claim 1, wherein the pressure of the reacting gases is maintained at a pressure of from 1 to 50 mm. of mercury column.

3. A device for producing stimulated light emission by means of flame reactions, comprising: an optical resonator, a reaction chamber inside said optical resonator, means for introducing acetylene and oxygen and gaseous metal compounds into said chamber comprising at least one tubular element having one end terminating in a gap arranged parallel to the axis of the optical resonator, the released energy of the flame reaction caused by the mixture of said acetylene and oxygen resulting at least partially in an overpopulation of one or more electron levels in the gases present or formed, said overpopulation being sufficient for stimulated light emission to occur.

References Cited

UNITED STATES PATENTS 3,309,620   3/1967   De Ment _____ 331—94.5

OTHER REFERENCES

Wieder: "High Power Gas Laser Studies," Interphase Corporation, West Technical Proposal 62R-1, May, 1962, 12 pages.

Barger et al.: "Optical Detection of Microwave Transitions in Electronically Excited CN Produced by a Chemical Reaction," Phys. Rev. Lett, vol. 9, pp. 345–47, Oct. 15, 1962.

Wieder et al.: "Exploratory Research on Population Inversions in Gaseous Explosions," Applied Optics Supplement on Chemical Lasers, pp. 187–192, January 1965.

RONALD L. WIBERT, Primary Examiner

E. BAUER, Assistant Examiner